United States Patent
Shukla et al.

(10) Patent No.: US 11,087,514 B2
(45) Date of Patent: Aug. 10, 2021

(54) IMAGE OBJECT POSE SYNCHRONIZATION

(71) Applicant: Adobe Inc., San Jose, CA (US)

(72) Inventors: Sankalp Shukla, Ghaziabad (IN); Sourabh Gupta, Noida (IN); Angad Kumar Gupta, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/438,079

(22) Filed: Jun. 11, 2019

(65) Prior Publication Data

US 2020/0394828 A1  Dec. 17, 2020

(51) Int. Cl.

| | |
|---|---|
| *G06T 15/00* | (2011.01) |
| *G06T 11/60* | (2006.01) |
| *G06T 7/70* | (2017.01) |
| *G06T 17/20* | (2006.01) |
| *G06F 3/0484* | (2013.01) |
| *G06F 3/0482* | (2013.01) |
| *G06K 9/00* | (2006.01) |

(52) U.S. Cl.
CPC ............ *G06T 11/60* (2013.01); *G06F 3/0482* (2013.01); *G06F 3/04845* (2013.01); *G06K 9/00362* (2013.01); *G06T 7/70* (2017.01); *G06T 17/20* (2013.01); *G06T 2207/30196* (2013.01)

(58) Field of Classification Search
CPC ........ G06T 13/40; G06T 1/60; G06T 2210/44
USPC ........................................................ 345/418
See application file for complete search history.

(56) References Cited

U.S. PATENT DOCUMENTS

| 7,515,155 | B2* | 4/2009 | Anderson | G06T 13/40 345/473 |
|---|---|---|---|---|
| 8,384,714 | B2* | 2/2013 | De Aguiar | G06T 13/40 345/420 |
| 9,030,479 | B2* | 5/2015 | Lee | G06T 13/40 345/474 |
| 9,336,182 | B2* | 5/2016 | Lee | B62D 57/032 |
| 9,443,307 | B2* | 9/2016 | Anderson | G06K 9/00228 |
| 10,535,176 | B2* | 1/2020 | Bard | G06T 1/60 |

(Continued)

OTHER PUBLICATIONS

Unreal Engine, Skeleton Assets: Anim Retargeting Different Skeletons | 03 | v4.8 Tutorial Series | Unreal Engine, Sep. 28, 2015, https://www.youtube.com/watch?v=xy9aLbZLdeA.*

(Continued)

*Primary Examiner* — Phu K Nguyen
(74) *Attorney, Agent, or Firm* — Kilpatrick Townsend & Stockton LLP

(57) ABSTRACT

Techniques for automatically synchronizing poses of objects in an image or between multiple images. An automatic pose synchronization functionality is provided by an image editor. The image editor identifies or enables a user to select objects (e.g., people) whose poses are to be synchronized and the image editor then performs processing to automatically synchronize the poses of the identified objects. For two objects whose poses are to be synchronized, a reference object is identified as one whose associated pose is to be used as a reference pose. A target object is identified as one whose associated pose is to be modified to match the reference pose of the reference object. An output image is generated by the image editor in which the position of a part of the target object is modified such that the pose associated with the target object matches the reference pose of the reference object.

19 Claims, 13 Drawing Sheets

(56) References Cited

U.S. PATENT DOCUMENTS

| | | | |
|---|---|---|---|
| 2015/0266183 A1* | 9/2015 | Alifragkis | B25J 9/1692 |
| | | | 700/254 |
| 2019/0035129 A1* | 1/2019 | Hutchinson | G06T 19/006 |
| 2019/0087997 A1* | 3/2019 | Bard | G06T 13/40 |
| 2019/0244390 A1* | 8/2019 | Doublet | G06F 21/32 |

OTHER PUBLICATIONS

Unreal Engine, Skeleton Assets: Importing, Sharing Skeletons & Anims | 02 | v4.8 Tutorial Series | Unreal Engine, Sep. 28, 2015, https://www.youtube.com/watch?v=JkcJ5bjGPsg&list=RDCMUCBobmJyzsJ6LI7Ubfhl4iwQ&index=1.*

Epic Games, Copy a Pose from another Skeletal Mesh | Unreal Engine Document, Sep. 27, 2018, https://docs.unrealengine.com/en-US/Engine/Animation/AnimHowTo/CopyPose/index.html.*

Okugawa, Y., Kubo, M., Sato, H. and Viet, B.D., 2019. Evaluation for the Synchronization of the Parade with Open Pose. The 2019 International Conference on Artificial Life and Robotics (ICAROB2019), Jan. 10-13.*

Okugawa Y, Kubo M, Shimohagi T, Ishihara T, Sato H. Analysis of a parade with the Kuramoto model-for better performance without trainings. In2018 IEEE International Conference on Systems, Man, and Cybernetics (SMC) Oct. 7, 2018 (pp. 4005-4010). IEEE.*

Adobe, "Make Quick Selections", Adobe Photoshop, https://helpx.adobe.com/in/photoshop/using/making-quick-selections.html accessed May 13, 2019, 8 pages.

Github, "CMU-Perceptual-Computing-La/openpose", https://github.com/CMU-Perceptual-Computing-Lab/openpose, accessed May 13, 2019, 7 pages.

Github, "openpose/output.md at mater CMU-Perceptual-Computing-Lab/openpose", https://github.com/CMU-Perceptual-Computing-Lab/openpose/blob/master/doc/output.md#face-and-hands accessed May 13, 2019, 10 pages.

* cited by examiner

IMAGE OBJECT POSE SYNCHRONIZATION

TECHNICAL FIELD

This disclosure relates generally to techniques for editing images. Specifically, the present disclosure describes techniques for automatically synchronizing poses of objects in an image or between multiple images.

BACKGROUND

Images are often captured where multiple actors in the image are performing a common or similar action. Examples of such images include images depicting a group dance performance, people skating in a line, synchronized swimming or gymnastics, and the like. Such images many times have a problem where the arms or legs (or other body parts) of the actors performing a similar action (e.g., multiple dancers) are not properly synchronized. For example, in an image, the arm of a first dancer may be at a first angle relative to the dancer's body while the corresponding arm of a second dancer in the image may be at a different angle instead of being at the same angle as the first dancer's arm. The chances of such a lack of synchronization increase as the number of actors in a scene increases. This is a common issue that a photographer faces while shooting an event. Due to this, many times, the captured image looks very different and not as good as the image that the photographer had intended to capture.

Currently, in order to address the synchronization issues in images, a photographer (or other user) has to manually edit such images. For example, a photographer can use an image editor to manually edit the image to synchronize the poses of the body parts. This editing is, however, a difficult and time-consuming task (e.g., the manual process typically involves setting lots of minute precise pin placements and holdings and manually manipulating body parts movements) even for an experienced user of the image editor, and almost impossible to perform properly for a non-expert user.

SUMMARY

The present disclosure describes techniques for automatically synchronizing poses of objects in an image or between multiple images. In contrast to conventional techniques discussed above, the synchronization is achieved automatically without the user having to make manual edits to the image to achieve the synchronization. This enables users, even non-expert users, to perform the synchronization quickly and easily. Various embodiments are described herein, including methods, systems, non-transitory computer-readable storage media storing programs, code, or instructions executable by one or more processors, and the like.

In certain embodiments, the automatic pose synchronization functionality is provided by an image editor. The image editor identifies or enables a user to select objects (e.g., people) whose poses are to be synchronized and the image editor then performs processing to automatically synchronize the poses of the identified objects. An output image is generated by the image editor in which the poses of the objects are synchronized.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
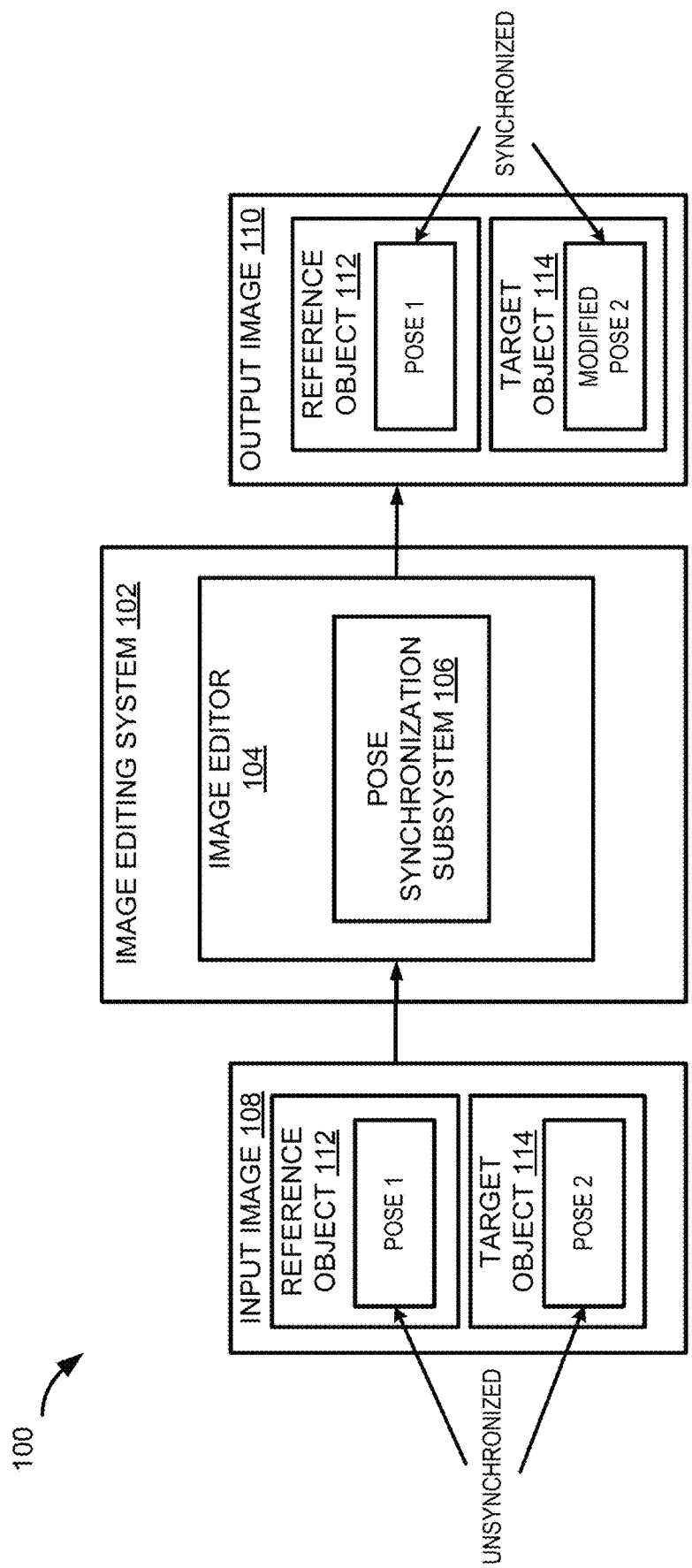
FIG. 1 depicts an example of a computing environment for automatic object part pose synchronization in an image, according to certain embodiments disclosed herein.

The present disclosure involves synchronizing poses of object parts in an image. As discussed above, currently the pose synchronization is performed manually by users which involves a complicated and time-consuming process. In contrast to conventional techniques discussed above, the image processing and editing techniques disclosed in this disclosure enable the synchronization to be performed automatically without the user having to manually painstakingly edit the image to achieve the synchronization. This enables users, even non-expert users, to perform the synchronization quickly and easily.

Certain embodiments described herein address the prior art limitations by providing automatic pose synchronization functionality. In certain embodiments, the automatic pose synchronization functionality is provided by an image editor. The image editor identifies or enables a user to select objects (e.g., people) whose poses are to be synchronized and the image editor then performs processing to automatically synchronize the poses of the identified objects. An output image is generated by the image editor in which the poses of the objects are synchronized.

In certain embodiments, for two objects whose poses are to be synchronized in an image (or across multiple images), one object is identified as the reference object and the other object is identified as the target object. A reference object is an object whose pose is to be used as a reference pose to be matched by the target object. A reference object can have one or more associated parts (e.g., a person can have arms, legs, etc.), each part having its own pose. A particular part of the reference object may be identified whose pose is to be matched. The part of the reference object whose pose is to be matched is referred to as a reference part. A target object is an object whose associated pose is to be modified to match the pose of the reference object. More particularly, a target object can have one or more parts, and the pose of a particular part of the target object is to be matched to the pose of the reference part. The part of the target object whose pose is to be modified to match the pose of the reference part is referred to as a target part.

In certain embodiments, a user, using the image editor, provides information identifying the reference and targets objects and also the reference and target parts. In other embodiments, the reference and target objects and also the reference and target parts may be detected by the image editor. For example, an image may display two dancers performing the same dance routine. A first dancer in the image may be identified as the reference object and the second dancer in the image may be identified as the target object. The left arm of the first dancer may be identified as the reference part and the corresponding left arm of the second dancer may be identified as the target part.

Once the reference and target objects and parts have been identified, the image editor determines the poses of the reference part and of the target part, and automatically modifies the pose of the target part to match or be in synchronization with the pose of the reference part. This modification is performed, for example, by performing one or more of moving, rotating, resizing or otherwise changing the target part of the target object to match the pose of the reference part. An output image is generated in which the pose of the target part of the target object matches or is in synchronization with the pose of the reference part of the reference object.

The following non-limiting example is provided to introduce certain embodiments. In this example, an image editor receives an input image containing multiple objects and where the pose associated with at least one object in the image does not match a pose associated with a second object in the image. As used herein, the term "image" refers to a photo, a picture, a digital painting, a computer-generated graphic, or any other artifact that depicts visual perception. The image editor employs a pose synchronization subsystem to synchronize the poses of parts of the first and second objects in the image. The pose synchronization subsystem in the image editor is configured to detect and identify a reference object and a target object, a reference part, and a target part whose pose is to be modified to match the pose of the reference part. As part of the synchronization processing, the pose synchronization subsystem is configured to determine the poses or positions of the reference part of the reference object and the target part of the target object, and then modify the position of the target part to make it match the position of the reference part.

In certain embodiments, the pose or position of a part of an object is defined by the position of that part of the object relative to another part of the object. For example, for a human object, the pose of an arm of the human can be defined as the position of the arm relative to the main body of the human, such as an angle between the arm and the main body. Accordingly, the position of a reference part whose pose is to be matched can be defined or measured by an angle between the reference part and another portion or part of the reference object. Likewise, the position of a target part whose pose is to be modified can be defined or measured by an angle between the target part and another portion or part of the target object. In certain embodiments, when the pose of the target part is changed to match the pose of the reference part, the angle associated with the target part is changed to match the angle associated with the reference part.

In certain embodiments, an object part (e.g., a reference part, a target part) can be made up of multiple subparts. For example, the arm of a human is made up of an upper arm and a lower arm connected at the elbow. In such a scenario, the pose of an object part is also defined by relative positions of these subparts. The pose of the arm thus also includes the relative position of the upper arm and the lower arm, such as the angle between these two subparts at the elbow. In instances where the reference and target parts each have multiple subparts, synchronizing their poses also includes synchronizing the positions (e.g., angles) of their subparts.

Accordingly, as part of determining the positions of the reference and target parts, the pose synchronization subsystem is configured to determine the poses of the reference part of the reference object and the target part of the target object and also of their subparts where applicable. Based upon these determined positions, the pose synchronization subsystem may determine that the poses of the reference part and the target part do not match, i.e. are not in synchronization. For example, the pose synchronization subsystem can determine that poses of the reference part and the target part do not match if the angle associated with the target part (e.g., the angle between the target part and another part of the target object) is different from the angle associated with the reference part (e.g., the angle between the reference part and another part of the reference object) by an amount greater than some threshold angle value. In situations where the reference and target parts have subparts, the angles associated with the subparts are also compared to determine if they are synchronized. Based on the determination, the pose synchronization subsystem changes the pose of the target part to a modified pose that matches the pose of the reference part, such as through rotating, shifting, scaling, wrapping, or other operations. An output image is generated by the pose synchronization subsystem in which the pose of the target part matches the pose of the reference part. As part of generating the output image, the pose synchronization subsystem additionally performs processing such as image inpainting, to reduce or eliminate visual artifacts created in the output image due to changing the position of the target part. The output image is saved in a storage device or output to a user for display.

The automatic pose synchronization functionality described herein provides several improvements and benefits over conventional techniques. In contrast to conventional techniques discussed above, the automatic pose synchronization functionality enables synchronization to be performed automatically without the user having to manually and painstakingly edit the image to achieve the synchronization. This enables users, even non-expert users, to perform the synchronization quickly and easily and produce high-quality images. As a result, the time taken to generate images with synchronized poses is significantly reduced as compared to prior techniques. In certain embodiments, objects and parts to be synchronized are automatically detected and the poses of the target object parts are adjusted in order to match the pose of a reference part. The automatic pose synchronization improves the quality of output images by reducing the impact of the uncertainty of the manual operations of inexperienced users on the quality of the output image. The overall user experience is improved.

Referring now to the drawings, FIG. 1 depicts an example of a computing environment 100 for automatically synchronizing poses of objects in input image 108. The computing environment 100 includes an image editing system 102, which can include an image editor 104 which further includes a pose synchronization subsystem 106 to perform automatic pose synchronization of parts of objects in image 108. The image editor 104 and the pose synchronization subsystem 106 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of ordinary skill in the art would recognize many possible variations, alternatives, and modifications. For example, in some implementations, the image editing system 102 can be implemented using more or fewer systems or subsystems than those shown in FIG. 1, may combine two or more subsystems, or may have a different configuration or arrangement of the systems or subsystems.

Figure 6A:
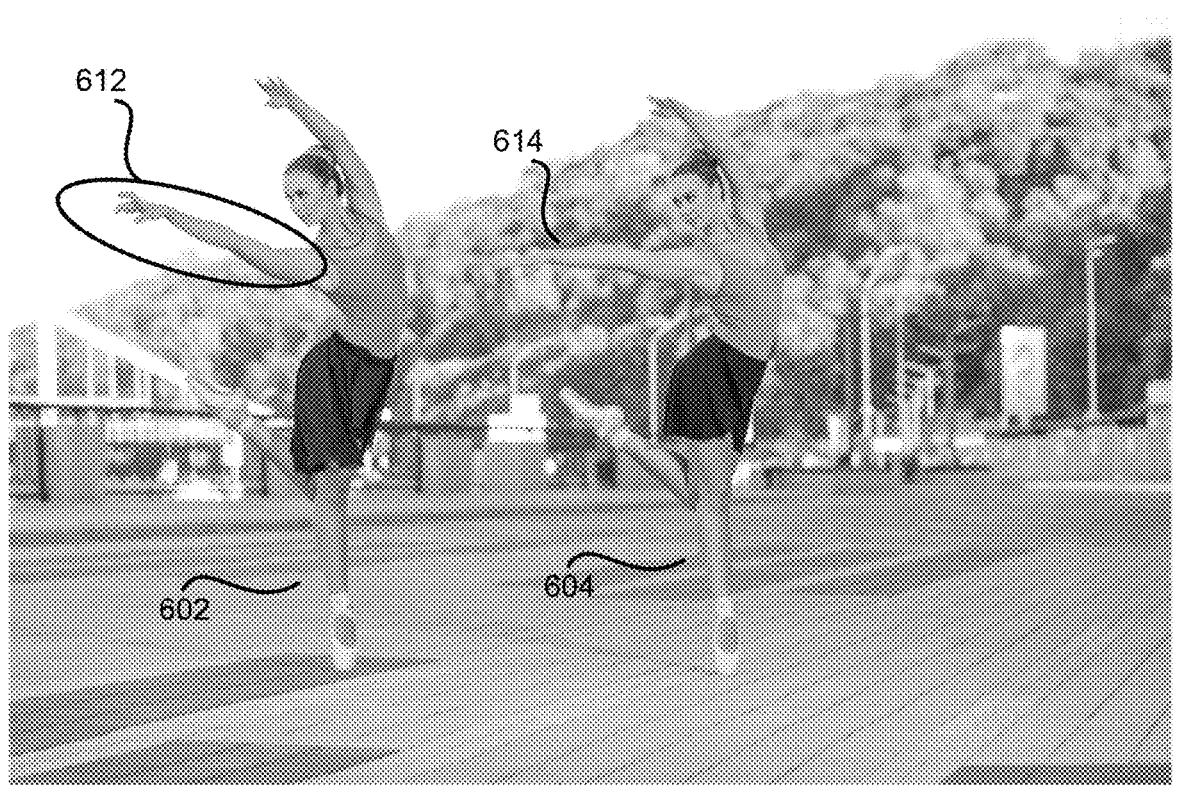
FIGS. 6A-6D depict examples of images involved in the automatic image object pose synchronization, according to certain embodiments disclosed herein.

The image editor 104 can be configured to receive an input image 108 that contains multiple objects, including at least a reference object 112 and a target object 114. An example of the input image 108 is shown in FIG. 6A which contains two human objects 602 and 604, i.e. the two dancers. There are various ways in which the image editor 104 may receive the input image 108. In one instance, a user may identify the image and cause the image editor 104 to upload the image 108. In another instance, the image editor 104 may receive the image from another software module within or outside the image editor 104.

One of the objects in the image 104 may be identified as the reference object 112 and another object in the image 104 may be identified as the target object 114. In the embodiment depicted in FIG. 1, the reference object 112 has an associated pose "pose 1." More particularly, the reference object 112 has a part (reference part) having a pose "pose 1," which is to be used as a reference pose. A pose "pose 2" is associated with the target object 114 in the input image 108. More particularly, the target object 114 has a part (target part) having a pose "pose 2," which is to be modified to match "pose 1" of the reference part. In the example shown in FIG. 6A, the dancer 602 on the left is the target object and the target part is her right arm 612 labeled using a circle in FIG. 6A. The dancer 604 on the right is the reference object and her right arm 614 is the reference part.

The image editor 104 uses the pose synchronization subsystem 106 to automatically synchronize poses associated with the reference and target objects. In certain embodiments, the pose synchronization subsystem 106 is configured to detect the reference object 112 and the target object 114. For example, for human objects, the pose synchronization subsystem 106 can detect the human objects in the input image 108 by using a key point estimation method for human body parts, such as hands, legs, neck, head, etc. Other types of objects, such as cars or houses, can be detected similarly by detecting, for example, key points of the objects, or other features of the objects. In certain embodiments, after objects have been detected from the image 108, a user of image editor 104 may specify, for example, through a user interface provided by image editor 104, which detected object is the target object 114 and which is the reference object 112. For example, the pose synchronization subsystem 106 may present and indicate the detected objects via the user interface. Through this user interface, the user can select, highlight, or otherwise specify one of the objects to be the reference object 112 and another object as the target object 114.

The image editor 104 can utilize the detected key points or features of the reference object 112 and the target object 114 to determine the poses of parts of the respective objects. As described above, the pose of an object part can be defined using the relative position of the part of the object with respect to another part of the object. If an object part has two or more subparts, the pose of the object part further includes the relative positions of these subparts. In the example where an object is a human object, the pose of a body part of the human object can include the angle between the body part and another body part of the human object, and, if the body part has multiple subparts, the angle(s) between the subparts.

Once the reference and target parts have been identified, the pose synchronization subsystem 106 determines if the poses associated with the reference and target parts are synchronized. In certain embodiments, if the pose of a target body part of the target human object and the pose of the corresponding reference body part of the reference human object have a difference higher than a threshold value, the pose synchronization subsystem 106 can determine that the poses of the reference part and the target part do not match or are not in synchronization. In that case, the pose synchronization subsystem 106 modifies the pose of the target part to match the pose of the reference part. For example, if the pose is described using the angle between two body parts of the human objects, the pose of the target part can be modified by moving, rotating, scaling or otherwise changing of the target part.

The image editor 104 is configured to generate an output image 110 in which the pose "modified pose 2" associated with target object 114 matches "pose 1" associated with the reference object 112. Accordingly, in the output image 110, the pose of the target part is changed such that it matches the pose of the reference part. Further details related to processing performed by the image editor for generating the output image 110 is described below.

For illustrative purposes, in the embodiment depicted in FIG. 1, both the reference object 112 and the target object 114 are shown as being contained in the same input image 108. This, however, is not intended to be limiting. In some scenarios, the reference object 112 and the target object 114 may be contained in two separate input images 108 and the process disclosed herein can be applied similarly to synchronize the pose of the target part in one image (target image) with the pose of the reference part in another image (reference image).

In addition, the description herein focuses on synchronizing a part of one target object with the corresponding part of a reference object. If the reference and target objects have multiple parts, and if so desired by the user, each pair of corresponding parts between the reference and target objects can be synchronized using the processing described in this disclosure. Likewise, more than one target object can be identified and poses associated with parts of the target objects are synchronized with the pose of the reference part of the reference object. In instances where multiple target objects are identified, one or more of the target objects may be in the same image as the reference object or in separate images.

Figure 2:
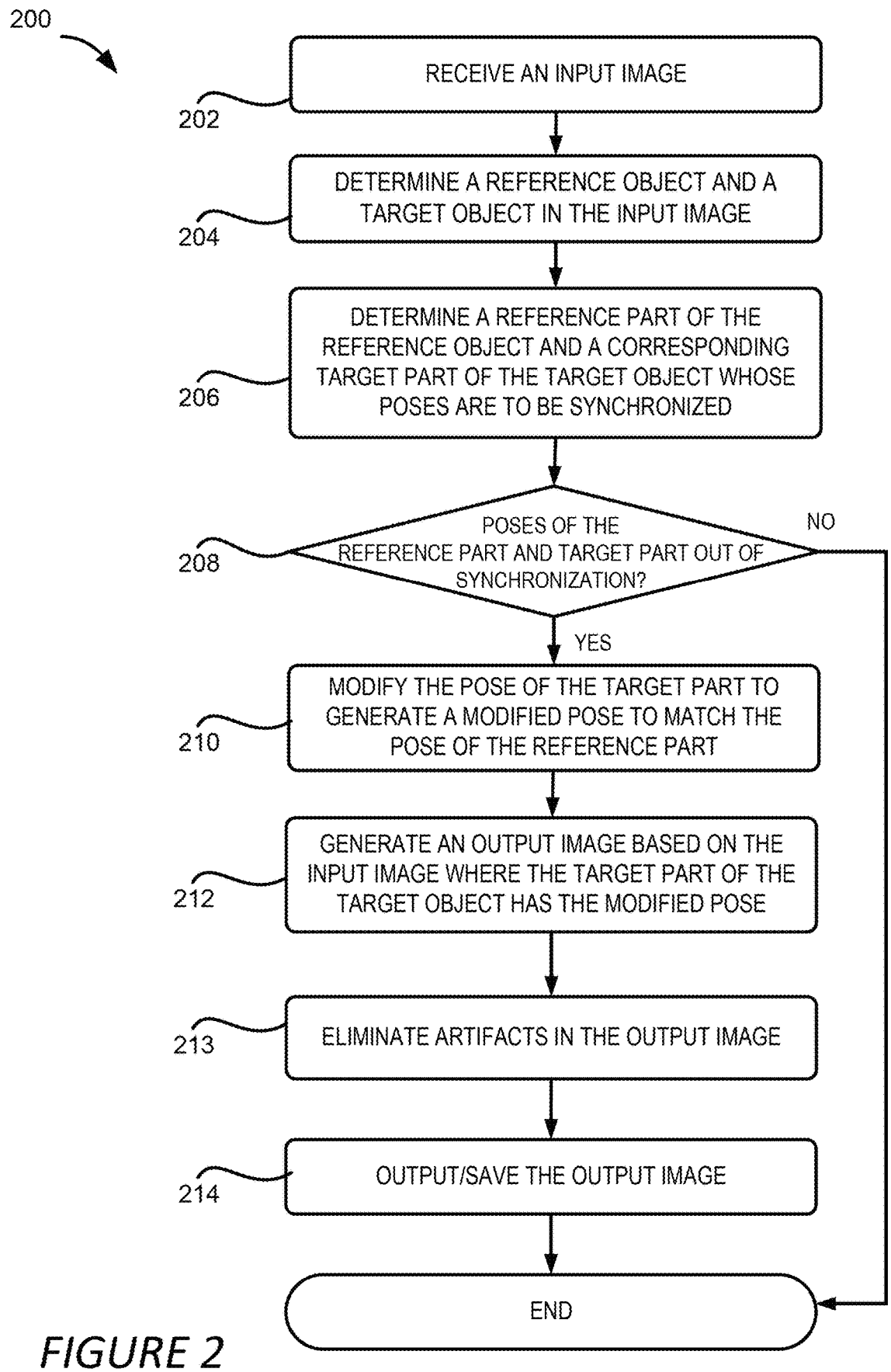
FIG. 2 depicts an example of a process for automatically synchronizing the poses of parts of two objects in an image, according to certain embodiments disclosed herein.

FIG. 2 depicts an example of a process 200 for automatically synchronizing the poses of parts of two objects in an image, according to certain embodiments of the present disclosure. One or more computing devices (e.g., the image editing system 102) implement operations depicted in FIG. 2 by executing suitable program code (e.g., the image editor 104). The software or program code may be stored on a non-transitory storage medium (e.g., on a memory device). The process depicted in FIG. 2 and described below is intended to be illustrative and non-limiting. Although FIG. 2 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the processing depicted in FIG. 2 may be performed by the image editor 104, such as by pose synchronization subsystem 106 of the image editor 104. For illustrative purposes, the process 200 is described with reference to certain examples depicted in the figures. Other implementations, however, are possible.

At 202, the process 200 involves receiving an input image. The input image contains multiple objects whose associated poses are to be synchronized. The image editor 104 may receive the input image 108 by a user uploading or selecting the input image 108 from an image data store or by receiving it from another software module within or outside the image editor 104.

At 204, the process 200 involves determining multiple objects, such as a reference object and a target object, in the input image 108. The image editor 104 may use various different techniques to extract objects from the image received in 202. According to one technique, the image editor 104 detects the objects by extracting key points or feature points of the objects in the input image 108. Other types of object detection methods, such as deep learning-based techniques based on neural networks may also be used for detecting objects from the image received in 202.

At 206, the process 200 involves determining the reference object, the target object, a reference part of the reference object and a corresponding target part of the target object whose poses are to be synchronized. The reference object, the target object, the reference part of the reference object and the target part of the target object can be determined based on user input specifying the target part of the target object and the reference part of the reference object and requesting the pose of the target part be synchronized with the pose of the reference part.

The reference part and the target part can also be determined based on the poses of the parts of the objects. The pose of an object part can be defined as the relative position of the object part with respect to another part or portion of the object and the relative positions of subparts of the object part. For example, for a human object part such as an arm, the angle between the arm part and the body part of the human object can be utilized to describe the pose of the object part arm. The pose of the arm can further include the angle between subparts of the arm, such as the upper arm and the lower arm. In certain embodiments, based on the poses of the object parts, the image editor 104 can use a heuristic method to determine an object part of one of the detected objects as the reference part and the corresponding part of another object as the target part.

For example, the image editor 104 might determine that a majority of the objects have a similar pose for an object part whereas the remaining objects have a different pose for the object part. The image editor 104 can then determine that one of the majority of objects is a reference object and the object part of the reference object is the reference part. The image editor 104 further determines that one of the remaining objects as the target object and its corresponding object part is the target part. For example, the image editor 104 detects four dancers in an image, and three of the dancers have a right arm pointing upwards whereas the fourth dancer has a right arm pointing forward. The image editor then determines that one of the three dancers is a reference object and the right arm of the reference object is the reference part. The image editor further determines that a fourth dancer is a target object and his/her right arm is the target part whose pose is to be synchronized with the reference part. Other rules for determining the reference part and the target part can also be utilized.

At 208, the process 200 involves determining whether the pose of the reference part of the reference object 112 and the pose of the target part of the target object 114 are out of synchronization, and in other words, whether the two poses match with each other. In one example, two poses are considered to be not in synchronization (i.e., not matching each other) if the difference between the two poses is greater than a threshold value. In the example where the poses of object parts of the reference object 112 and the target object 114 are described using angles between parts and subparts of the objects, the image editor 104 can determine that the pose of the reference part and the pose of the target part do not match or are not in synchronization if the difference between the angles of the reference part and the angles of the target part is higher than a threshold angle value. Other ways of determining the mismatch between the poses of the reference part and the target part can also be utilized.

If it is determined at 208 that the poses of the reference part and the target part match or are in synchronization with each other, then process 200 ends. If it is determined at 208 that the poses of the reference part and the target part do not match (i.e., are not in synchronization), then process 200 continues with 210.

At 210, the process 200 involves modifying the pose of the target part so that it matches the pose of the reference part. The image editor 104 can change the pose of the target part by shifting, rotating, scaling or otherwise re-arranging the position of the target part from its original pose to a modified pose that matches the pose of the reference part.

At 212, the process 200 involves generating an output image 110 based on the input image 108, where, in the output image 110, the target part of the target object is in the modified pose instead of being in the original pose that was in the original input image 108.

At 213, the process 200 involves eliminating artifacts in the output image 110. Changing the pose of the target part can lead to undesired visible artifacts being introduced in the output image. For example, when the target part is moved from its original position to a modified position to match the pose of the reference part, it exposes an area of the image that was previously covered by the target part before the change. As part of generating the output image, the image editor 104 performs processing to address these issues to reduce or remove undesired artifacts introduced in the image due to the modification of the target part. The processing can include, for example, generating image content for the area exposed due to the moving of the target part. In certain embodiments, this is done using techniques such as image inpainting, adjusting the color or intensity values of the target part of the target object 114 due to its new pose, and so on.

At 214, the process 200 involves outputting the output image 110 and/or saving the output image 110 to a storage device. For example, the image editor 104 may output the output image 110 by displaying it via a user interface of the image editor 104. This allows the user to see the end result of the automatic pose synchronization processing. In certain embodiments, the output image may be provided as input to a downstream image processing operation.

The objects whose poses are synchronized can be different types of objects. These objects may include human objects, car objects, building objects, animal objects, etc. Each object can have one or more parts whose poses are to be automatically synced.

Figure 3:
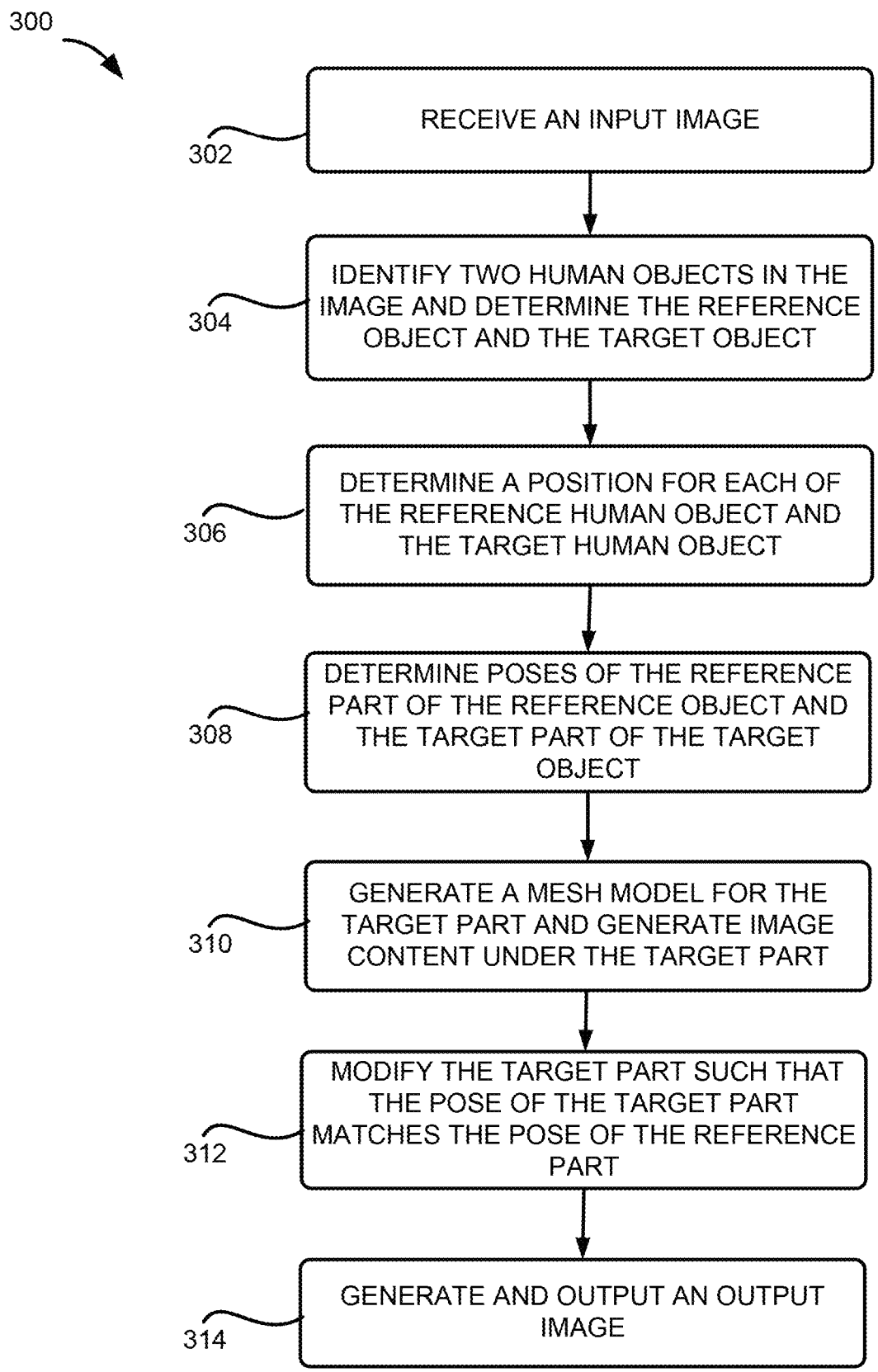
FIG. 3 depicts an example of a process for automatically synchronizing the poses of body parts of two human objects in an image, according to certain embodiments disclosed herein.
Figure 4A:
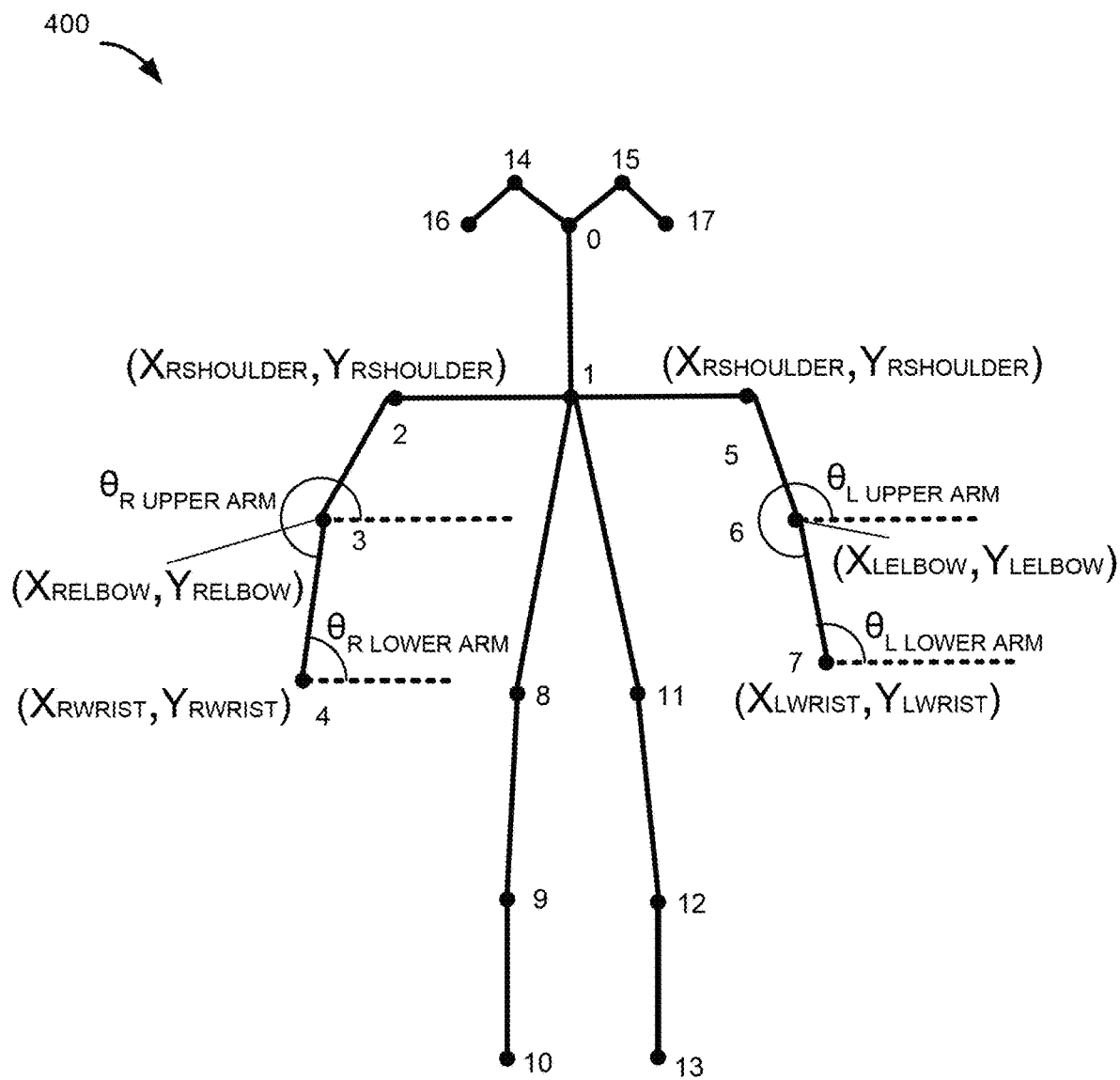
FIG. 4A depicts an example of key points of human body parts that can be estimated from a human object, according to certain embodiments disclosed herein.
Figure 4B:
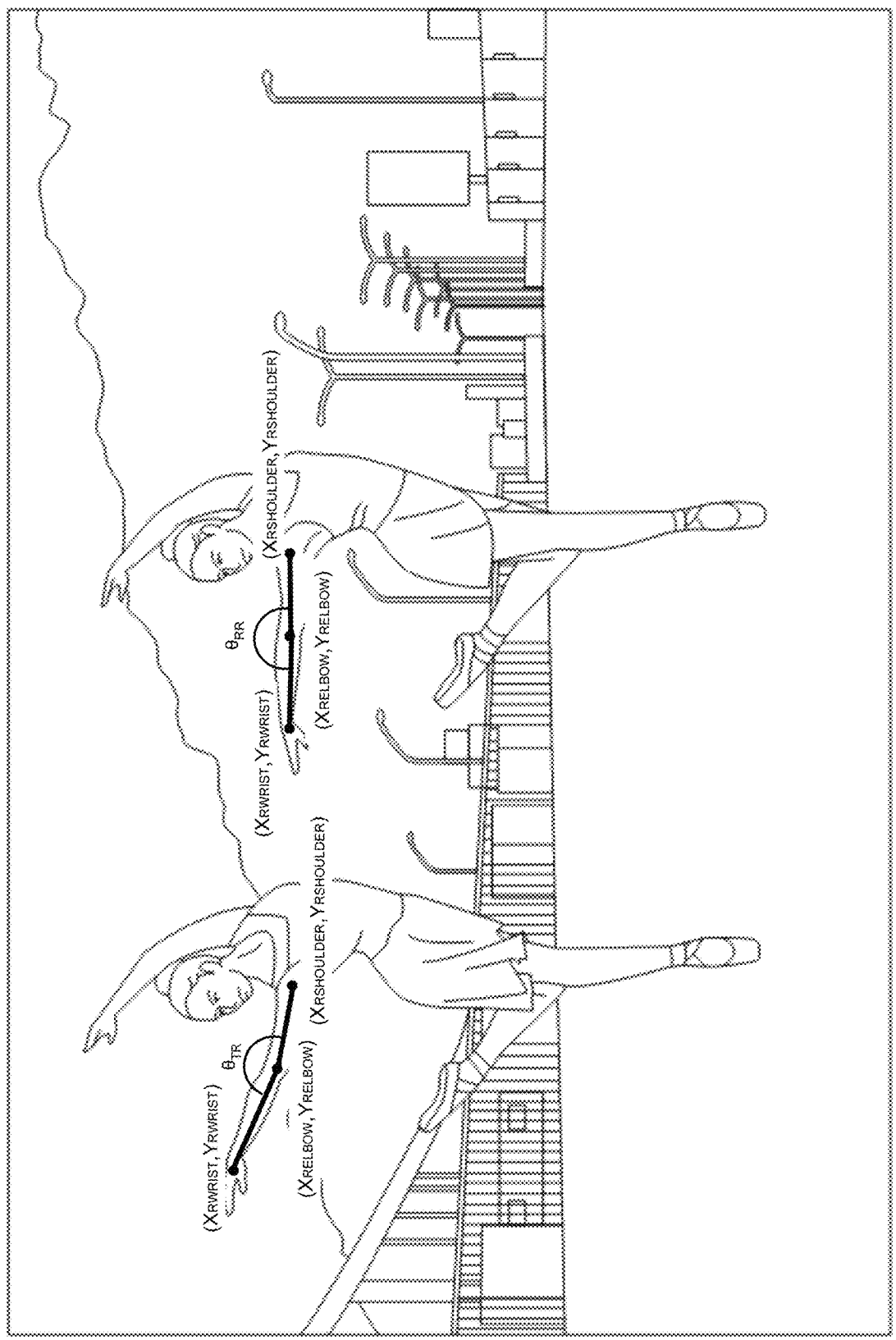
FIG. 4B depicts an example of determining the pose of a human body part using the key points of the human body parts, according to certain embodiments disclosed herein.
Figure 5:
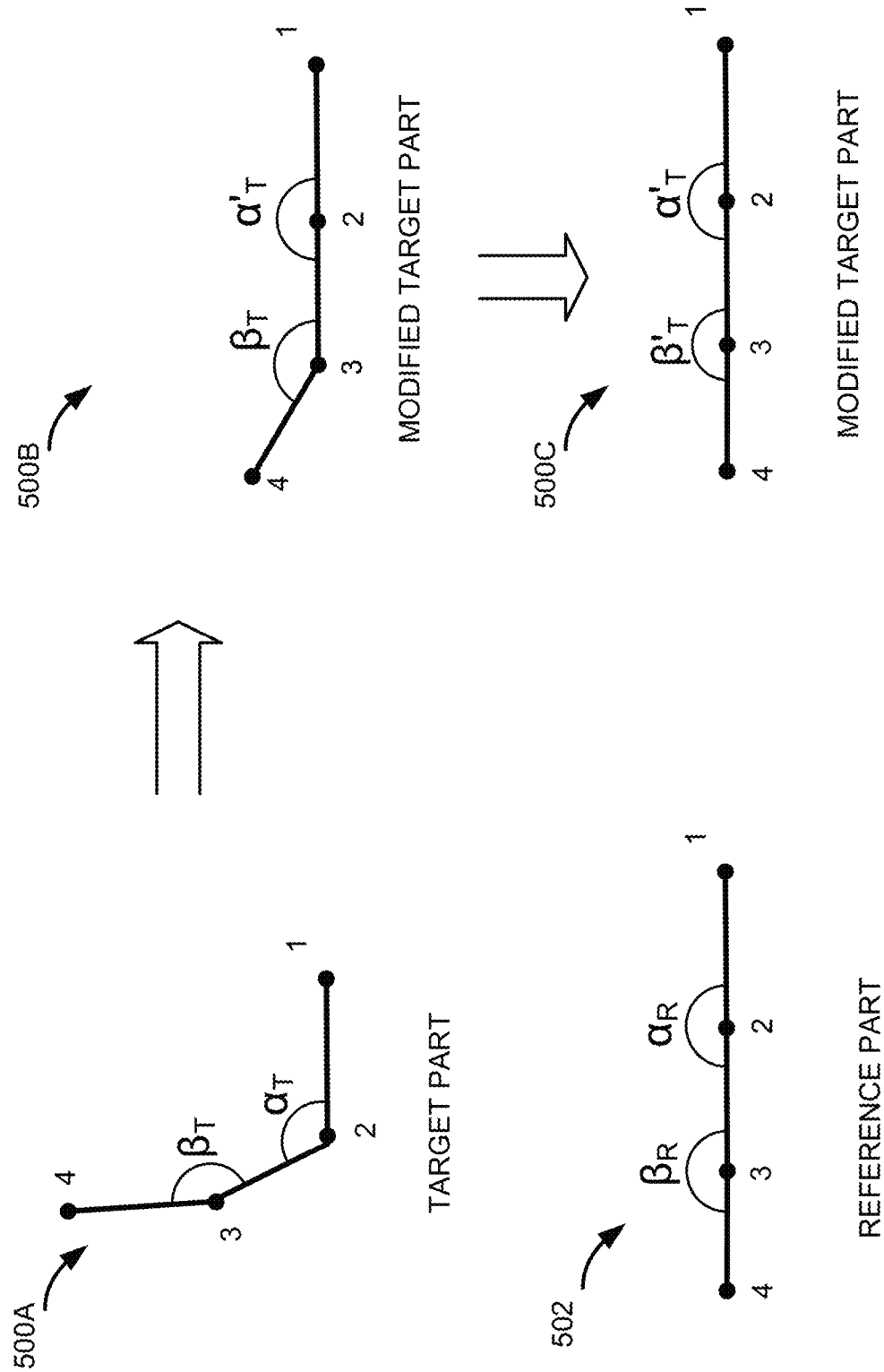
FIG. 5 depicts an example of rotating a human body part of a target object to match the pose of a corresponding body part of a reference object, according to certain embodiments disclosed herein.

FIG. 3 depicts an example of applying the process 200 to human objects. Specifically, FIG. 3 depicts a process 300 for automatically synchronizing the body parts of two human objects in an image, according to certain embodiments disclosed herein. FIG. 3 is described in conjunction with FIGS. 4A, 4B and 5. FIG. 4A depicts an example of key points of human body parts that can be estimated from a human object, according to certain embodiments disclosed herein. FIG. 4B illustrates an example of an angle between the upper arm and the lower arm of a human object derived using the coordinates of the key points of the human object. FIG. 5 depicts an example of rotating a human body part of a target object to match the pose of a reference object, according to certain embodiments disclosed herein. One or more computing devices (e.g., the image editing system 102) implement operations depicted in FIG. 3 by executing suitable program code (e.g., the image editor 104). The software or program code may be stored on a non-transitory storage medium (e.g., on a memory device). The process depicted in FIG. 3 and described below is intended to be illustrative and non-limiting. Although FIG. 3 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the processing depicted in FIG. 3 may be performed by the image editor 104, such as by pose synchronization subsystem 106 of the image editor 104. For illustrative purposes, the process 300 is described with reference to certain examples depicted in the figures. Other implementations, however, are possible.

At 302, the process 300 involves receiving an input image 108 that contains at least two human objects. The image editor 104 may receive the input image 108 by a user uploading or selecting the input image 108 from an image data store or by receiving it from another software module within or outside the image editor 104.

At 304, the process 300 involves identifying at least two human objects in the input image 108. Any human object detection method can be employed to identify human objects from the input image 108, such as deep learning-based human object detection, feature-based human object detection, and so on.

Based on the detected human objects, the image editor 104 further determines a reference object 112 and a target object 114 from the detected human objects. The image editor 104 can determine the reference object 112 and the target object 114 by receiving a user input through a user interface. For example, the user input may include a first user selection of a detected human object as the reference object 112 and a second user selection of a detected human object as the target object 114. The image editor 104 can also provide suggestions regarding the reference object 112 and the target object 114 based on heuristic methods. For example, as discussed above, the image editor 104 can determine that one of the objects is different from other objects and present in the user interface an indication of this object to be a suggested target object. Other ways can also be utilized to determine the reference object 112 and the target object 114.

At 306, the process 300 involves determining the position of each of the reference human object and the target human object and their body parts. In one example, the image editor 104 does this using keypoint estimation techniques to estimate the poses of the reference and target objects. For example, in certain embodiments, the image editor 104 can perform 2D pose estimation based upon multi-person keypoint detection, for example, using neural networks to model different types of body parts. Other models may be used in alternative embodiments to detects the positions of other types of objects such as animate objects such as animals, and also inanimate objects such as cars, machines, etc.

FIG. 4A depicts an example of pose estimation of a human based upon key points of human body parts that can be estimated for a human object, according to certain embodiments disclosed herein. In the example shown in FIG. 4A, 18 key points are detected for a human object. The 18 key points can include: point 0 (nose), point 1 (neck), point 2 (right shoulder), point 3 (right elbow), point 4 (right wrist), point 5 (left shoulder), point 6 (left elbow), point 7 (left wrist), point 8 (right hip), point 9 (right knee), point 10 (right ankle), point 11 (left hip), point 12 (left knee), point 13 (left ankle), point 14 (right eye), point 15 (left eye), point 16 (right ear) and point 17 (left ear). These key points are utilized to estimate the body parts of a person, such as the right upper arm (defined by the key points 2 and 3), the left upper arm (defined by the key points 5 and 6), and so on.

At 308, the process 300 involves determining the poses or positions of the parts of the reference and target objects that are to be synchronized. As part of the processing in 308, positional attributes of the reference part of the reference human object and of the target part of the target human object are determined. The determined positional attributes of the reference part and the target part are then utilized to determine the pose of the reference part of the reference human object and the target part of the target human object. The positional attributes can include, for example, angles for the body part which can be defined as the angles between the body part and a reference, which can be another body part, a horizontal line or a vertical line. The positional attributes for a body part can further include the angles for subparts of the body part. The positions of these subparts can be defined or specified in terms of angles between the subparts, another body part, a horizontal line or a vertical line. Accordingly, the position of a body part can be defined or specific using various positional attributes (e.g., angles) measured for and associated with the body part. These angles may include one or more angles made by the body part with other parts or portions of the human object, and/or, where applicable, angles associated with subparts of the body part. Such positional attributes are measured for both the reference part (e.g., the left arm of a first dancer in the image) and the target part (e.g., a left arm of a second dancer in the image). As part of the processing in 308, these positional attributes are then used to determine the poses of the reference and target parts and used to determine how to modify the target part such that its pose matches the pose of the reference part.

For example, the positional attributes of an arm of a person can include an angle associated with the arm, an angle associated with the upper arm and an angle associated with the lower arm. These angles can be determined as:

$$\theta_{RUpper\ Arm} = a\tan 2(Y_{RElbow} - Y_{RShoulder}, X_{RElbow} - X_{RShoulder}),$$

$$\theta_{RLower\ Arm} = a\tan 2(Y_{RWrist} - Y_{RElbow}, X_{RWrist} - X_{RElbow}),$$

$$\theta_{LUpper\ Arm} = a\tan 2(Y_{LElbow} - Y_{LShoulder}, X_{LElbow} - X_{LShoulder}),$$

$$\theta_{LLower\ Arm} = a\tan 2(Y_{LWrist} - Y_{Elbow}, X_{LWrist} - X_{LElbow}).$$

where $(X_{RElbow}, Y_{RElbow})$ $(X_{LElbow}, Y_{LElbow})$, $(X_{RShoulder}, Y_{RShoulder})$, $(X_{LShoulder}, Y_{LShoulder})$, $(X_{LWrist}, Y_{LWrist})$ and $(X_{RWrist}, Y_{RWrist})$ are the coordinates of the right and left elbows, the right and left shoulders, and the right and left wrists of the human object in the two-dimensional space of the image, respectively. $\theta_{RUpper\ Arm}$, $\theta_{RLower\ Arm}$, $\theta_{LUpper\ Arm}$, $\theta_{RLower\ Arm}$ are the angles for the right upper arm, right lower arm, left upper arm and right lower arm compared to the horizontal line in the two-dimensional space, respectively. Based on these angles, angles between two subparts can also be generated. For example, the angle between the right upper arm and the left upper arm can be derived from $\theta_{RUpper\ Arm}$, and $\theta_{RLower\ Arm}$. Similarly, an angle associated with an arm can be determined as the angle between the upper arm of the arm and the shoulder connected to the arm.

FIG. 4B illustrates an example of an angle between the upper arm and the lower arm of a human object derived using the coordinates of the key points of the human object. In FIG. 4B, the dancer on the left is the target object and the dancer on the right is the reference object. The right arm of the target dancer is the target part whose pose, the angle between the upper arm and the lower arm $\theta_m$ in this example, is to be synchronized with the pose of the reference part, i.e the angle between the upper arm and the lower arm $\theta_{RR}$ of the dancer on the right. The angle $\theta_m$ can be derived from the $\theta_{RUpper\ Arm}$ and $\theta_{RLower\ Arm}$ discussed above through, for example $\theta_{TR} = 180 - \theta_{RUpper\ Arm} + \theta_{RLower\ Arm}$. Similarly, the angle $\theta_{RR}$ can be derived based on the $\theta_{RUpper\ Arm}$ and $\theta_{RLower\ Arm}$ calculated using the corresponding keypoints of the reference object.

Based on the calculated body part angles, the image editor 104 determines whether the pose of the target part of the target human object matches or is in synchronization with the pose of the reference part of the reference human object in order to determine whether to perform automatic pose synchronization. In one example, the image editor 104 determines that the pose of the target human object does not match the pose of the reference human object if the difference between angles of corresponding body parts or subparts exceeds a threshold angle value. For example, the image editor 104 can determine that the pose of the target part does not match the pose of the reference part if the difference between the angles associated with the right upper arms of the two human objects is higher than a threshold angle value, such as 20 degrees. Similarly, the angles associated with other subparts can also be utilized to determine the mismatch between the poses of two human object parts. In another example, the image editor 104 can determine that the pose of the target human object does not match that of the reference human object if the angles associated with the body parts or subparts of these two human objects are different.

In some examples, the image editor 104 can also utilize the determined poses of the parts of the human objects to facilitate the selection of the reference object 112 and the target object 114. For instance, the image editor 104 can determine that one of the human objects has a part with a pose different from or does not match the poses of the corresponding part of the majority of other human objects. This part of the human object can be identified as a suggested target object and presented to the user through the user interface.

If the image editor 104 determines that the poses of the target part and the reference part do not match, the image editor 104 performs the automatic synchronization of the mismatched body parts. To synchronize the body parts, at block 310, the process 300 involves generating a mesh model for the target part. In one example, the image editor 104 generates an object region mask to isolate the target human object in the image. The object region mask can be generated using, for example, a deep learning model pre-trained for selecting a person in an image. As a result, a mask of a person's body is obtained. The image editor 104 can utilize the key points of the body parts determined in block 304 to extract the body part mask from the object region mask. In the above example where the right arm of the target object is to be synchronized, the key points of the right shoulder, right elbow and right wrist can be utilized to extract the mask for the right arm of the target human object.

Figure 6B:
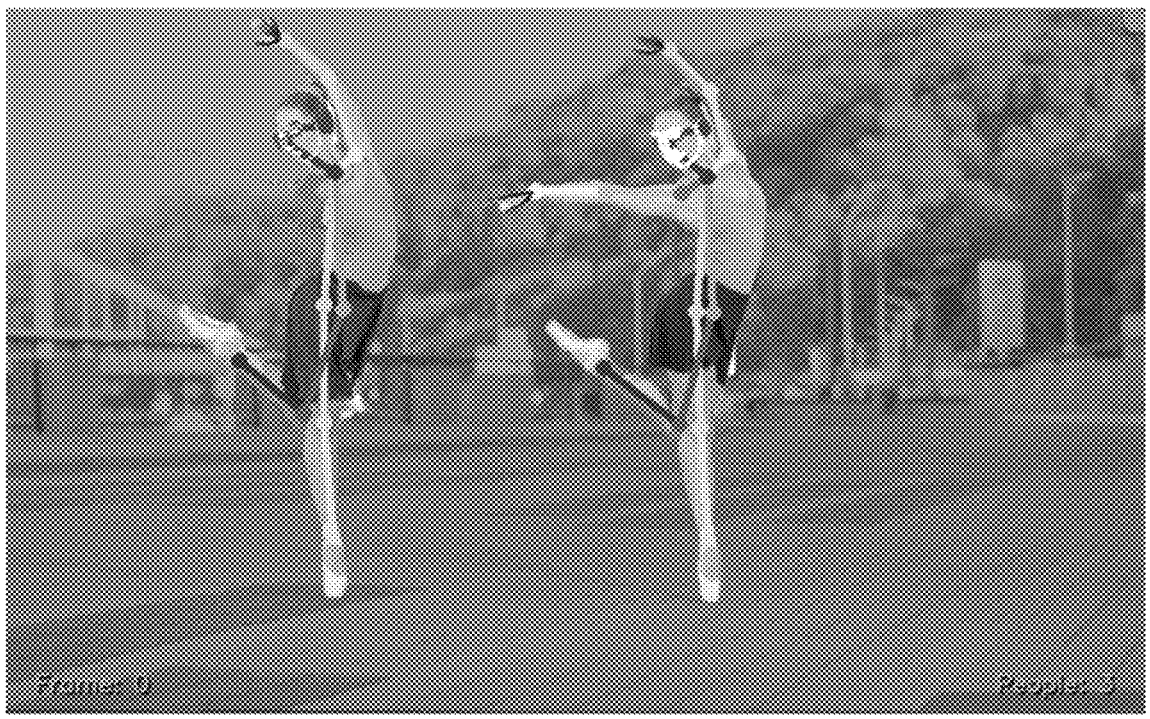
Figure 6C:
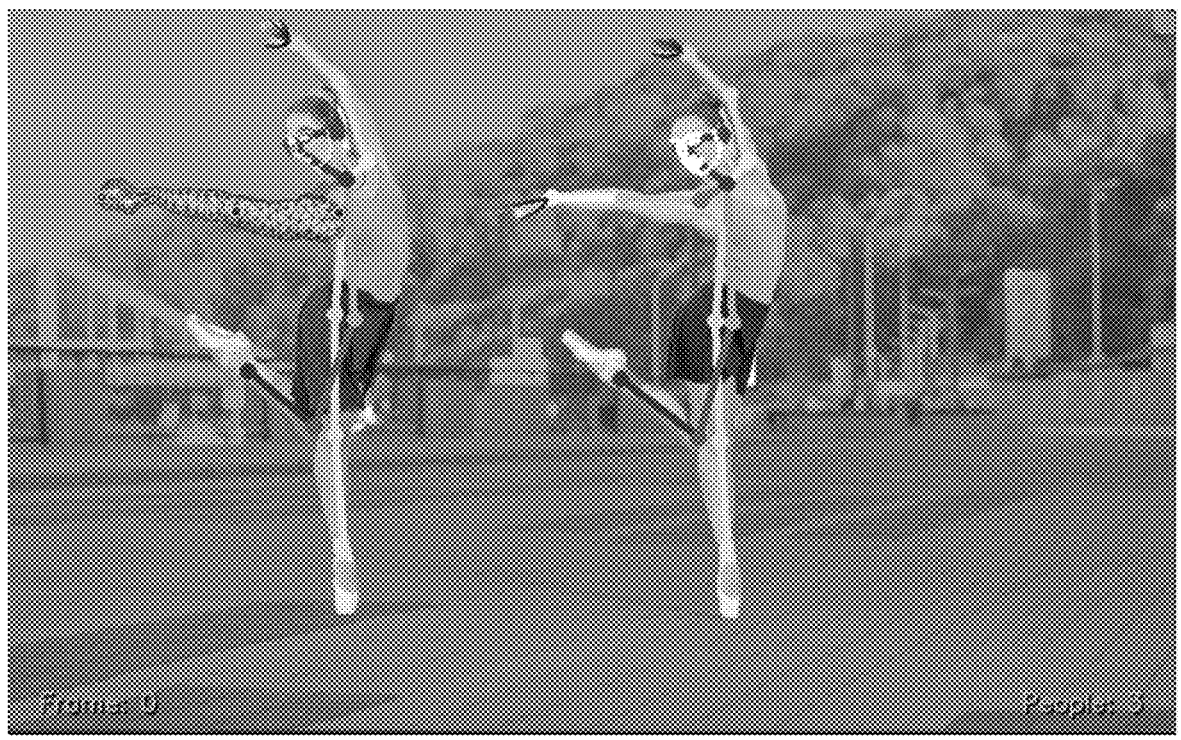

Based on the body part mask, the image editor 104 generates a mesh for the body part. FIG. 6C shows an example of the mesh generated for the right arm of the target human object. In one example, the mesh is a triangle mesh generated using Berkeley Triangulation method or any other mesh generation method known in the art. The mesh of the body part allows the body part to be moved, wrapped or otherwise changed without introducing visual artifacts. For example, if the right lower arm of the human object is bent upwards, the mesh of the right arm can guide the generation of image content for expanding the skin area below the right elbow while compressing the skin area above the right elbow naturally. Similarly, if an arm is rotated around the shoulder, the mesh of the arm allows the image content for the area connecting the arm to the shoulder to be generated naturally based on the rotation.

At block 310, the process 300 further involves generating the image content for the area that is covered by the target body part of the target object. Because synchronizing the pose of the target object changes the target body part in a certain way, such as shifting, rotating, stretching, and so on, the area that was previously covered or occluded by the target body part might be exposed after the change leading to one or more hole areas in the image. To fill the hole areas in the image, the image editor 104 can employ image inpainting techniques to generate the image content. Various image inpainting techniques can be utilized, such as content-aware image inpainting that fills the hole area based on the content of the image or any other image inpainting technique known in the art. FIG. 6B shows an example of an image where the content aware image inpainting is utilized to fill the area of the image that was occluded by the target body part, the right arm of the dancer on the left in this example. By generating the image content for this area, no hole areas will be generated after moving or otherwise changing the position of the target part of the target object to a modified pose.

At block 312, the process 300 involves modifying the target body part of the target human object such that the pose of the target part matches the pose of the reference body part of the reference human object. The modifications can include shifting, rotating, scaling or other types of operations. FIG. 5 depicts an example of modifying the target body part of a target human object by rotating the target body part to match the pose of a reference body part of a reference object, according to certain embodiments disclosed herein. In the example shown in FIG. 5, diagram 500A shows the pose of the target body part, i.e. the right arm of the target human object. The pose includes an angle $\alpha_T$ for the target part, defined as the angle between the right upper arm and the right shoulder. Because the target part includes subparts: an upper arm and an lower arm, the pose of the target part further includes an angle associated with the subparts of the target part, i.e. the angle $\beta_T$ between the upper arm and the lower arm in this example. Likewise, the pose of the reference part, the upper arm of a reference object in the example shown in FIG. 5, also includes an angle associated with the reference part, i.e. angle $\alpha_R$ between the upper arm and the shoulder, and an angle associated with the subparts of the reference part, i.e. angle $\beta_R$ between the upper arm and the lower arm.

In order to synchronize the pose of the target body part with that of the reference body part, the image editor 104 creates two pins at arm key points. The first pin is created at the shoulder key point 2 and the second pin is created at the wrist key point 4. The image editor 104 uses the shoulder pin as a hinge point and rotates the wrist pin to a point where the angle of the modified upper arm of the target part, denoted as $\alpha'_T$ in FIG. 5, matches $\alpha_R$, as shown in diagram 500B. To continue the synchronization, the image editor 104 creates another two pins at arm key points, one at the right elbow key point 3 and one at the wrist key point 4. The image editor 104 uses the elbow pin as the hinge point and rotates the wrist pin to a point where the angle of subparts of the modified target part $\beta'_T$ matches angle $\beta_R$ of the reference part, as shown in diagram 500C.

Referring back to FIG. 3, at block 314, the process 300 involves generating an output image in which the target body part of the target object is in the modified pose that matches the pose of the reference object part. The image editor 104 further processes the output image, for example, by adjusting the color or intensity values of the target body part based on its new position in the image. The image editor 104 then outputs the output image for storage, display or other usages.

FIGS. 6A-6D depict examples of images involved in the automatic pose synchronization, according to certain embodiments disclosed herein. FIG. 6A shows an input image having two human objects (female dancers). As can be seen in FIG. 6A, the poses of the right arms of the two dancers are not in synchronization. The image editor 104 might determine, for example through receiving user input, that the right arm of the dancer on the left (circled in FIG. 6A) should be synchronized to the pose of the right arm of the dancer on the right. The dancer on the right is thus the reference object with the right arm of the dancer being the reference part, and the dancer on the left is the target object with the right arm of the dancer being the target part.

FIG. 6B shows the masks and the key points of the body parts of the two dancers in the image determined by the image editor 104. This figure further shows the background content generated for the area under the right arm of the target human object as discussed above with regard to block 310 of FIG. 3. The generated background content allows the right arm of the target human object to be moved or changed without creating hole areas in the image.

FIG. 6C shows the mesh generated for the right arm of the target human object and the new location of the right arm after the rotation. In this example, the mesh is a triangle mesh generated using Berkeley Triangulation method. The mesh of the body part allows the body part to be moved, wrapped or otherwise changed without introducing visual artifacts.

Figure 6D:

FIG. 6D shows the output image generated by the automatic pose synchronization presented herein. As depicted in FIG. 6D, in the output image, the position of the right arms of the dancer on the right (the target dancer) has been changed to a position that matches the pose of the right arm of the dancer on the left (the reference dancer).

Figure 7:
FIG. 7 depicts an example of a graphical user interface through which a user can initiate the automatic object part pose synchronization, according to certain embodiments disclosed herein.
Figure 7:
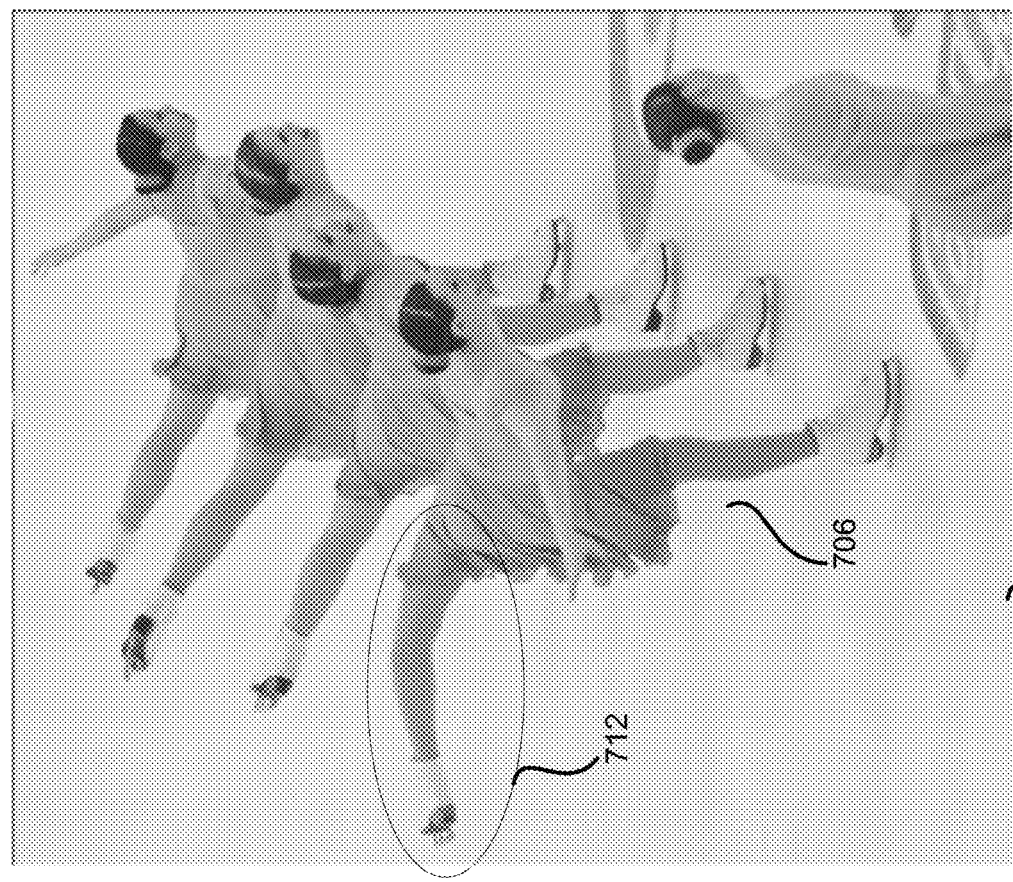
Figure 8:
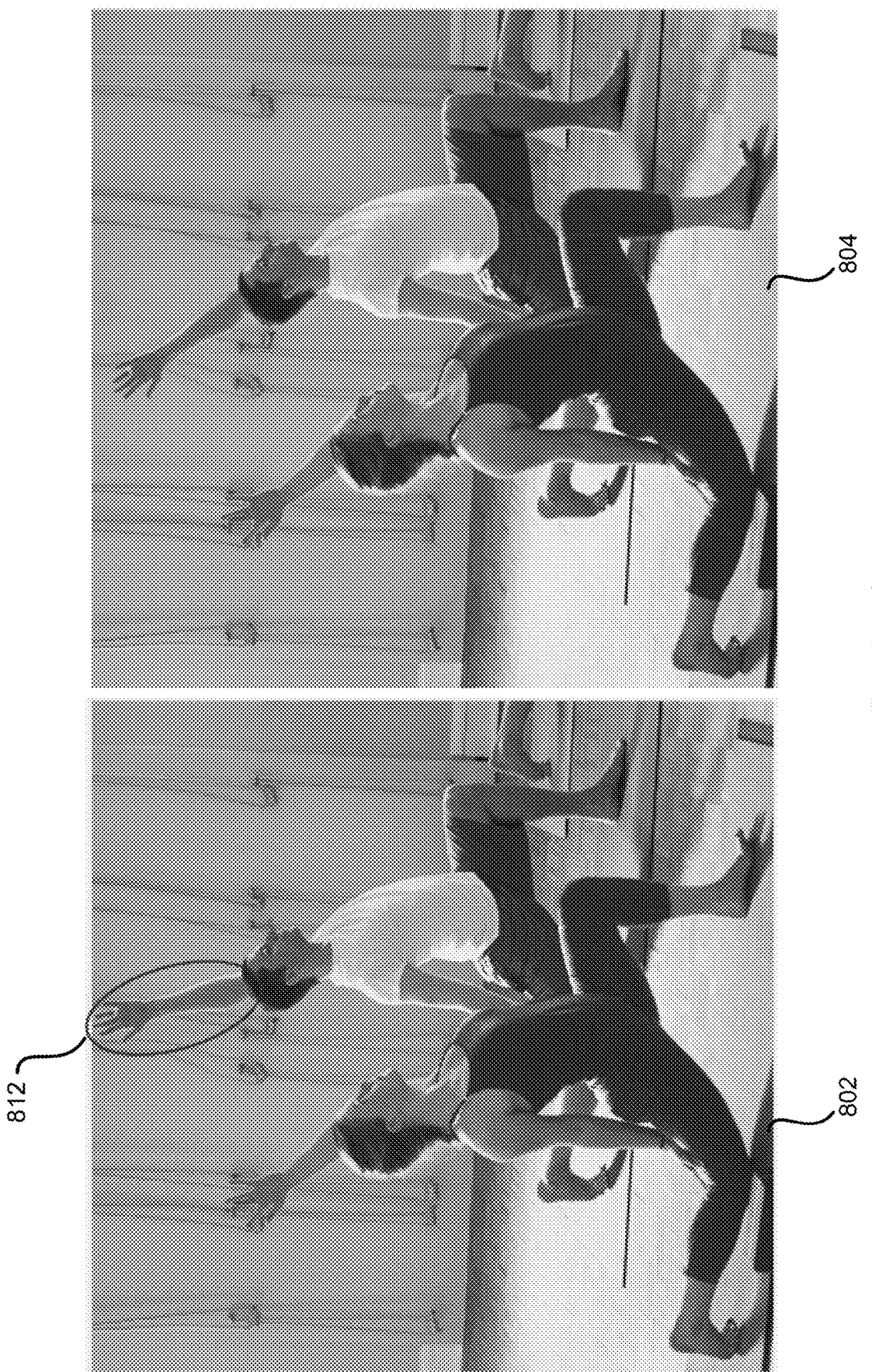
FIG. 8 depicts an example of an input image with object parts whose poses are to be synchronized and an output image with the corresponding poses of object parts are synchronized according to certain embodiments disclosed herein.

FIGS. 7 and 8 show additional examples of the input images and respective output images of the automatic pose synchronization. In FIG. 7, the input image 702 has an object, the skater 706, whose pose is out of synchronization with the other three skaters in the image. In particular, the left leg 712 of skater 706 does not match the pose of the left legs of the remaining three skaters. Image 704 shows the output image after applying the automatic pose synchronization on the input image 702. In the output image 704, the left leg of the skater 706 (the target skater) has been changed to a pose that matches the pose of the remaining three skaters. Any of the three skaters can serve as a reference object. In the example shown in FIG. 8, image 802 is the input image and image 804 is the output image generated by applying the automatic pose synchronization on the input image 802. In the input image, the pose of the left arm 812 (the target part) of the man (the target object) does not match the left arm (the reference part) of the woman (the reference object). The pose of the left arm of the man has been changed to match that of the woman in the output image 804.

Figure 9:
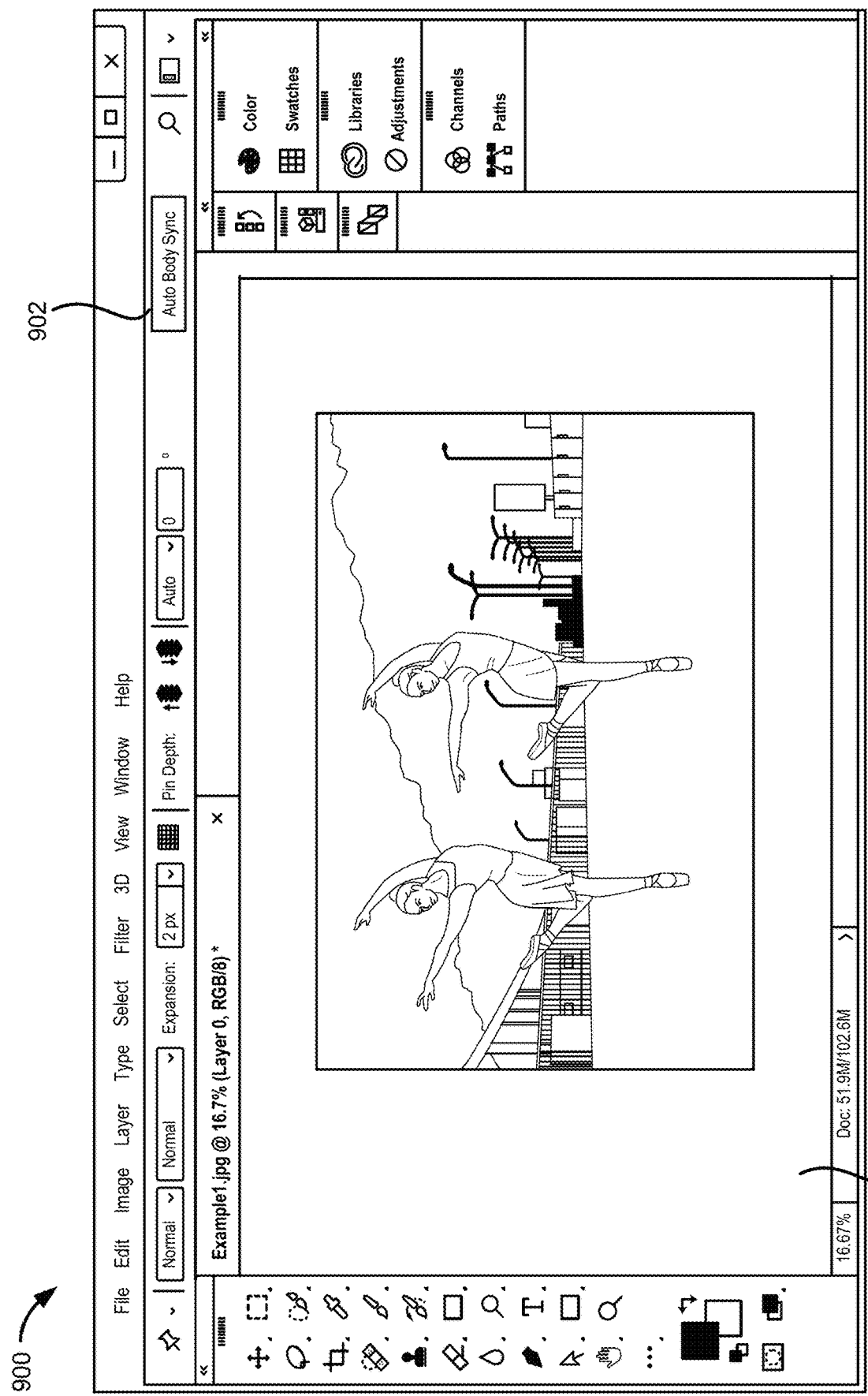
FIG. 9 depicts another example of an input image and the corresponding output image of the automatic object part poses synchronization according to certain embodiments disclosed herein.

FIG. 9 shows an example of the graphical user interface (GUI) 900 provided by an image editor for the automatic pose synchronization feature, according to certain embodiments. The GUI 900 includes an image display section 904 configured for displaying a loaded image. For example, an input image can be loaded and displayed in the image display section 904. An output image generated per the teachings in this disclosure may also be displayed in section 904. In certain embodiments, the input image and the output image can be displayed side-by-side to facilitate easy comparison by a user. The GUI 900 further includes various user interface controls for performing image editing functions, such as cropping, marking, adding text to the image, etc. The GUI 900 also includes a user interface control 902 (e.g., a button as shown in FIG. 9) that is selectable by a user to request pose synchronization. Although not shown in GUI 900, one or more user interface controls selectable by a user may be provided that enables the user to specify the reference object, the reference part, the target object, and the target part.

For illustration purposes, the examples provide and described above focus on the automatic synchronization of human objects. This is however not intended to be limiting. The automatic pose synchronization functionality can also be applied to various other types of objects, including other types of living objects, such as animals, or non-living objects such as houses, cars, and cycles. Similar methods can be applied to these non-human objects. In general, the automatic pose synchronization techniques described herein can be applied to any two objects whose poses are to be synchronized. For example, for objects such as construction cranes, a crane model can be established and key points of various parts of a crane can be extracted from the different crane objects in an image, such as the undercarriage, the carrier, the boom, etc. The pose of a crane part can be described as the relative position of the crane part compared with other parts of the crane and the relative positions of subparts of the crane part. Synchronizing the crane parts can thus include shifting or moving the target part of the target crane object to match that of the reference crane object. Other ways of describing the pose of a living or non-living object and other ways of synchronizing the poses of a target part and a reference part may also be utilized.

It should be further appreciated that although the examples described above, focus on synchronizing objects present in a single image (i.e., both the reference object and the target object are in the same input image), this is again not intended to be limiting. In alternative embodiments, the reference object and the target object can appear in different images. In such an embodiment, the output image is generated based upon the input image containing the target object and, in the output image, a pose associated with the target object is changed to match a pose associated with the reference object. In addition, there could be multiple target objects whose associated poses are to be synchronized with a pose associated with a reference object. The automatic pose synchronization process described above can be applied to each of the target objects to achieve the synchronization.

It should be further understood that the automatic pose synchronization presented herein can be performed for video, where a target object in the video can be automatically synchronized with a reference object in the same or a different video, for example, by applying the above-described process for a reference object and a target object appearing in a sequence of frames of a video(s).

Figure 10:
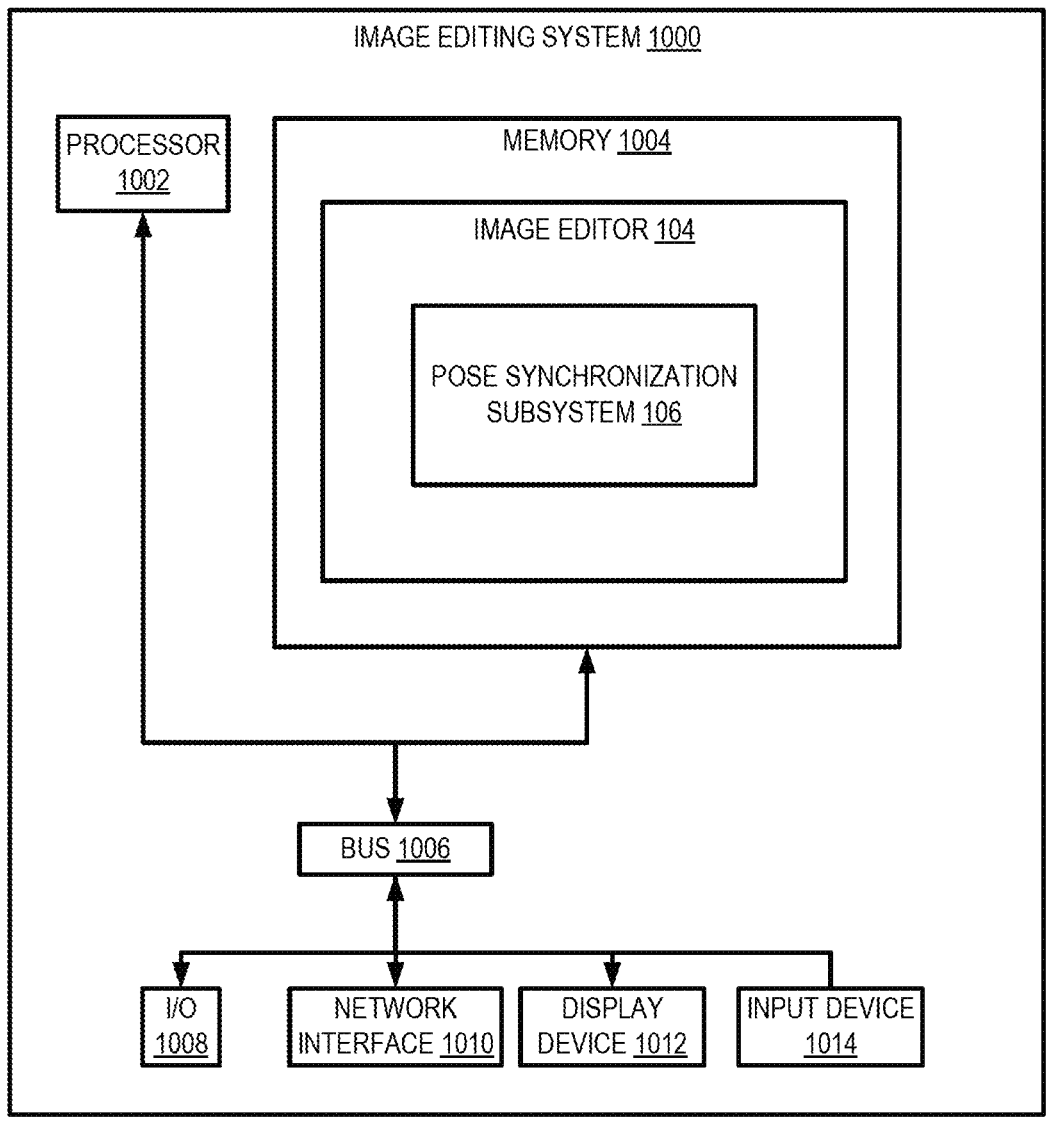
FIG. 10 depicts an example of an image editing system that executes an image editor for performing certain embodiments disclosed herein.

Any suitable computing system or group of computing systems can be used for performing the operations described herein. For example, FIG. 10 depicts an example of a computing system 1000 that can implement the computing environment of FIG. 1. In some embodiments, the computing system 1000 includes a processing device 1002 that executes the image editor 104 including the pose synchronization subsystem 106, a memory that stores various data computed or used by the image editor 104 and the pose synchronization subsystem 106, an input device 1014 (e.g., a mouse, a stylus, a touchpad, a touchscreen, etc.), and a display device 1012 that displays graphical content generated by the image editor 104. For illustrative purposes, FIG. 10 depicts a single computing system on which the image editor 104 is executed, and the input device 1014 and display device 1012 are present. But these applications, datasets, and devices can be stored or included across different computing systems having devices similar to the devices depicted in FIG. 10.

The depicted example of a computing system 1000 includes a processing device 1002 communicatively coupled to one or more memory devices 1004. The processing device 1002 executes computer-executable program code stored in a memory device 1004, accesses information stored in the memory device 1004, or both. Examples of the processing device 1002 include a microprocessor, an application-specific integrated circuit ("ASIC"), a field-programmable gate array ("FPGA"), or any other suitable processing device. The processing device 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as an input device 1014, a display device 1012, or other input or output devices. For example, the computing system 1000 is shown with one or more input/output ("I/O") interfaces 1008. An I/O interface 1008 can receive input from input devices or provide output to output devices. One or more buses 1006 are also included in the computing system 1000. The buses 1006 communicatively couples one or more components of a respective one of the computing system 1000.

The computing system 1000 executes program code that configures the processing device 1002 to perform one or more of the operations described herein. The program code includes, for example, the image editor 104 or other suitable applications that perform one or more operations described herein. The program code may be resident in the memory device 1004 or any suitable computer-readable medium and may be executed by the processing device 1002 or any other suitable processor. In some embodiments, all modules in the image editor 104 (e.g., the pose synchronization subsystem 106, etc.) are stored in the memory device 1004, as depicted in FIG. 10. In additional or alternative embodiments, one or more of these modules from the image editor 104 are stored in different memory devices of different computing systems.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., a computing device that receives inputs for image editor 104 or displays outputs of the image editor 104) via a data network using the network interface device 1010.

An input device 1014 can include any device or group of devices suitable for receiving visual, auditory, or other suitable input that controls or affects the operations of the processing device 1002. Non-limiting examples of the input device 1014 include a touchscreen, stylus, a mouse, a keyboard, a microphone, a separate mobile computing device, etc. A display device 1012 can include any device or group of devices suitable for providing visual, auditory, or other suitable sensory output. Non-limiting examples of the display device 1012 include a touchscreen, a monitor, a separate mobile computing device, etc.

Although FIG. 10 depicts the input device 1014 and the display device 1012 as being local to the computing device that executes the image editor 104, other implementations are possible. For instance, in some embodiments, one or more of the input device 1014 and the display device 1012 can include a remote client-computing device that communicates with the computing system 1000 via the network interface device 1010 using one or more data networks described herein.

Figure 11:
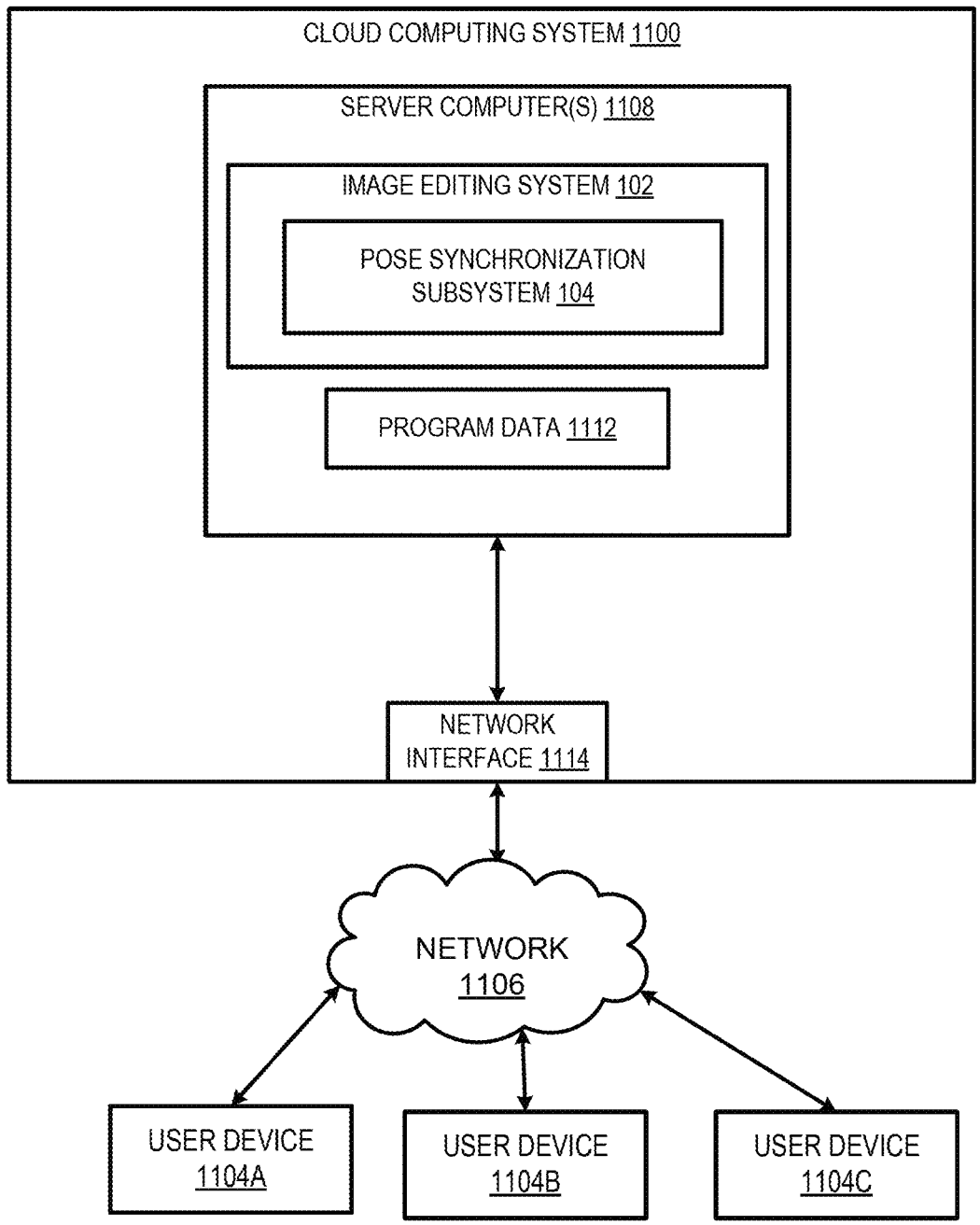
FIG. 11 depicts an example of a cloud computing system for implementing certain embodiments disclosed herein.

In some embodiments, the functionality provided by the image editing system 102 may be offered as cloud services by a cloud service provider. For example, FIG. 11 depicts an example of a cloud computing system 1100 offering an image editing service as a cloud service that can be subscribed to by one or more subscribers. Subscribers can interact with the cloud computing system via one or more user devices 1104A, 1104B, and 1104C that are capable of communicating with the cloud computing system 110 via a communication network 1106. Communication network 110 may be any type (or types) of network familiar that facilitates communications between cloud computing system 1100 and the user devices. Communication network 1106 may support various data communication protocols, including without limitation wired and wireless protocols. Merely by way of example, network 1106 can be the Internet, a local area network (LAN), an Ethernet, a wide-area network (WAN), a virtual private network (VPN), an intranet, an extranet, a public switched telephone network (PSTN), and the like.

The cloud computing system 1100 also includes a network interface device 1114 that enable communications to and from cloud computing system 1100. In certain embodiments, the network interface device 1114 includes any device or group of devices suitable for establishing a wired or wireless data connection to network 1106. Non-limiting examples of the network interface device 1114 include an Ethernet network adapter, a modem, and/or the like. The cloud computing system 1100 is able to communicate with the user devices 1104A, 1104B, and 1104C via the network 1106 using the network interface device 1114.

In certain embodiments, the automatic pose synchronization functionality may be offered as a cloud service under a Software as a Service (SaaS) model. One or more users may subscribe to the image editing service offering the pose synchronization functionality, and the cloud computing system performs the processing to provide the image editing service to subscribers.

The cloud computing system may include one or more remote server computers 1108 that provide the cloud services offered by cloud computing system 1100. The remote server computers 1108 include any suitable non-transitory computer-readable medium for storing program code (e.g., an image editing system 102) and program data 1112, or both, which is used by the cloud computing system 1100 for providing the cloud services. A non-transitory computer-readable medium can include any electronic, optical, magnetic, or other storage device capable of storing computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1108 can include volatile memory, non-volatile memory, or a combination thereof.

The one or more of the servers 1108 can include one or more processors that are configured to execute the program code to perform one or more of the operations that provide image editing services, including the ability to automatically synchronize the pose of object parts in an input image provided by one or more subscribers. As depicted in the embodiment in FIG. 11, the one or more servers providing the services to automatically synchronize pose of object parts in an image may implement an image editor 104 which includes a pose synchronization subsystem 106. Any other suitable systems or subsystems that perform one or more operations described herein (e.g., one or more development systems for configuring an interactive user interface) can also be implemented by the cloud computing system 1100.

In certain embodiments, the cloud computing system 1100 may implement the services by executing program code and/or using program data 1112, which may be resident in a memory device of the server computers 1108 or any suitable computer-readable medium and may be executed by the processors of the server computers 1108 or any other suitable processor.

In some embodiments, the program data 1112 includes program code executable by the one or more processors, and other data (e.g., metadata, models such as models used for estimating positions of objects) used for providing the automatic pose synchronization functionality. Examples of the data include image data, new image content, object data, etc. In some embodiments, one or more of data, models, and functions are stored in the same memory device. In additional or alternative embodiments, one or more of the programs, data, models, and functions described herein are stored in different memory devices accessible via the data network 1106.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more computing systems perform operations comprising:
    from an input image depicting a first object and a second object, determining a first pose of a first part of the first object and a second pose of a second part of the second object, wherein the second pose is different from the first pose;
    determining that a position of the second part of the second object in the second pose is to be changed from the second pose to a modified pose that matches the first pose of the first part of the first object;
    changing, automatically by the one or more computing systems the position of the second part of the second object from the second pose to the modified pose; and
    generating an output image depicting the first object and the second object, wherein, in the output image, the second part of the second object is in the modified pose instead of in the second pose and the first part of the first object is in the first pose.

2. The computer-implemented method of claim 1, wherein:
    determining the first pose of the first part comprises:
        identifying, in the input image, a first plurality of key points associated with the first object, the first plurality of key points defining a first plurality of parts of the first object including the first part;
        determining the first pose of the first part by determining at least a first angle between the first part and a third part of the first plurality of parts of the first object;
    determining the second pose of the second part comprises:
        identifying, in the input image, a second plurality of key points associated with the second object, the second plurality of key points defining a second plurality of parts of the second object including the second part; and
        determining the second pose of the second part by determining at least a second angle between the second part and a fourth part of the second plurality of parts of the second object; and
    changing the position of the second part comprises changing the position of the second part such that an angle between the second part and the third part matches the first angle.

3. The computer-implemented method of claim 1 wherein:
    the first object is a first human;
    the second object is a second human;
    the first part is a body part of the first human; and
    the second part is a body part of the second human.

4. The computer-implemented method of claim 3, wherein the first part is an arm, a leg, a head, a neck, or a shoulder of the first human.

5. The computer-implemented method of claim 1 wherein changing the position of the second part comprises:
    determining a first angle associated with the first part;
    determining a second angle associated with the second part;
    determining that the second angle varies from the first angle by at least a threshold angle value; and
    changing the position of the second part such that an angle associated with the second part matches the first angle.

6. The computer-implemented method of claim 5 wherein changing the position of the second part further comprises:
    determining a third angle associated with subparts of the first part;
    determining a fourth angle associated with subparts of the second part; and
    changing the position of the second part such that an angle associated with the subparts of the second part matches the third angle.

7. The computer-implemented method of claim 1, wherein changing the position of the second part comprises:
    generating a mesh model of the second part; and
    changing the position of the second part to the modified pose based on the mesh model of the second part.

8. The computer-implemented method of claim 1, wherein generating the output image comprising the second object comprises generating image content for an area previously occluded by the second part of the second object.

9. The computer-implemented method of claim 1, wherein determining that a position of the second part of the second object is to be changed from the second pose to the modified pose comprises:
    receiving a user input requesting the second pose of the second part of the second object be synchronized with the first pose of the first part of the first object.

10. The computer-implemented method of claim 1, wherein the input image is a photograph.

11. The computer-implemented method of claim 1, wherein the output image comprises the first object comprising the first part in the first pose.

12. The computer-implemented method of claim 1, further comprising, prior to determining the first pose and determining the second pose:
- providing a user interface configured to edit images from the input image, the user interface comprising a user-selectable option for requesting synchronization of poses associated with objects; and
- receiving an indication of selection of the user-selectable option for synchronizing poses associated with the first object and the second object.

13. A system comprising:
- one or more processors; and
- a non-transitory computer-readable medium communicatively coupled to the one or more processors, the non-transitory computer-readable medium storing program code executable by the one or more processors, the program code comprising instructions that, when executed by the one or more processors, cause the one or more processors to perform operations comprising:
  - from an image depicting a first object and a second object, determining a first pose of a first part of the first object in the image and a second pose of a second part of the second object in the image, wherein the second pose is different from the first pose;
  - determining that a position of the second part of the second object in the second pose is to be changed from the second pose to a modified pose that matches the first pose of the first part of the first object;
  - changing, automatically by the one or more processors, the position of the second part of the second object from the second pose to the modified pose; and
  - generating an output image depicting the first object and the second object, wherein, in the output image, the second part of the second object is in the modified pose instead of in the second pose and the first part of the first object is in the first pose.

14. The system of claim 13, wherein
determining the first pose of the first part comprises:
- identifying, in the image, a first plurality of key points associated with the first object, the first plurality of key points defining a first plurality of parts of the first object including the first part; and
- determining the first pose of the first part by determining at least a first angle between the first part and a third part of the first plurality of parts of the first object;

determining the second pose of the second part comprises:
- identifying, in the image, a second plurality of key points associated with the second object, the second plurality of key points defining a second plurality of parts of the second object including the second part; and
- determining the second pose of the second part by determining at least a second angle between the second part and a fourth part of the second plurality of parts of the second object; and changing the position of the second part comprises changing the position of the second part such that an angle between the second part and the third part matches the first angle.

15. The system of claim 13, wherein changing the position of the second part comprises:
- determining a first angle associated with the first part;
- determining a second angle associated with the second part;
- determining that the second angle varies from the first angle by at least a threshold angle value; and
- changing the position of the second part such that an angle associated with the second part matches the first angle.

16. The system of claim 15, wherein changing the position of the second part further comprises:
- determining a third angle associated with subparts of the first part;
- determining a fourth angle associated with subparts of the second part; and
- changing the position of the second part such that an angle associated with the subparts of the second part matches the third angle.

17. A non-transitory computer-readable medium having program code that is stored thereon, the program code executable by one or more processing devices for performing operations comprising:
- from an image depicting a first object and a second object, determining a first pose of a first part of the first object in the image and a second pose of a second part of the second object in the image, wherein the second pose is different from the first pose;
- determining that a position of the second part of the second object in the second pose is to be changed from the second pose to a modified pose that matches the first pose of the first part of the first object;
- changing, automatically by the one or more processing devices, the position of the second part of the second object from the second pose to the modified pose; and
- generating an output image depicting the first object and the second object, wherein, in the output image, the second part of the second object is in the modified pose instead of in the second pose and the first part of the first object is in the first pose.

18. The non-transitory computer-readable medium of claim 17,
wherein determining the first pose of the first part comprises:
- identifying, in the image, a first plurality of key points associated with the first object, the first plurality of key points defining a first plurality of parts of the first object including the first part; and
- determining the first pose of the first part by determining at least a first angle between the first part and a third part of the first plurality of parts of the first object;

wherein determining the second pose of the second part comprises:
- identifying, in the image, a second plurality of key points associated with the second object, the second plurality of key points defining a second plurality of parts of the second object including the second part; and
- determining the second pose of the second part by determining at least a second angle between the second part and a fourth part of the second plurality of parts of the second object; and wherein changing the position of the second part comprises changing the position of the second part such that an angle between the second part and the third part matches the first angle.

19. The non-transitory computer-readable medium of claim 17, wherein changing the position of the second part comprises:
- determining a first angle associated with the first part;
- determining a second angle associated with the second part;

determining that the second angle varies from the first angle by at least a threshold angle value; and changing the position of the second part such that an angle associated with the second part matches the first angle.

\* \* \* \* \*